Patented Mar. 30, 1937

2,075,393

UNITED STATES PATENT OFFICE 2,075,393

HYDROXYPHENYLAMINOARYLES OF THE PYRENE AND CHRYSENE SERIES AND PROCESS OF PRODUCING SAME

Walter Hagge, Dessau in Anhalt, and Herbert Bach, Bitterfeld, Germany, assignors to General Aniline Works, Inc., New York, N. Y., a corporation of Delaware No Drawing. Application October 22, 1935, Serial No. 46,120. In Germany November 9, 1934

8 Claims. (Cl. 260—128)

This invention relates to the manufacture of new valuable condensation products applicable as intermediate products in the manufacture of dyes. They are made by the reaction of a hydroxyaminobenzene with a hydroxy- or amino-derivative of a tetranuclear aromatic hydrocarbon of the group consisting of pyrene or chrysene, at a temperature of about 130 to 170° C., in an open or closed vessel and in presence of a bisulfite liquor, the hydroxyaminobenzene being present in considerable excess.

The following examples illustrate the invention, the parts being by weight:—

*Example 1.*—22 parts of 3-hydroxypyrene are mixed with 50 parts of 1-hydroxy-4-aminobenzene, 20 parts of anhydrous sodium sulfite and 150 parts by volume of bisulfite liquor of 38° Bé. and the mixture is heated for 40 hours at 160 to 170° C. The condensation product thus obtained is washed with hot water and dissolved in dilute caustic soda lye with addition of sodium hydrosulfite, and the solution is filtered; sodium bisulfite is added to the filtrate and the precipitate thus obtained is washed with water. The product is 25 parts of 4'-hydroxyphenylaminopyrene, being 80 per cent. of the theoretical yield. It becomes spontaneously deep dark-blue, especially in presence of a trace of alkali.

*Example 2.*—12 parts of 2-hydroxychrysene, 25 parts of 1-hydroxy-4-aminobenzene, 75 parts by volume of bisulfite liquor of 38° Bé. and 10 parts of anhydrous sodium sulfite are together heated for 40 hours at 160 to 170° C. The condensation product thus obtained is filtered, washed with hot water and purified by recrystallization from dilute caustic soda lye with addition of some hydrosulfite. From the solution in dilute caustic soda lye the compound can be precipitated by means of sodium bisulfite. 12.8 parts are obtained, which is 78 per cent. of the theoretical yield. The condensation product oxidizes spontaneously in the presence of a trace of alkali.

*Example 3.*—12 parts of 2-aminochrysene are mixed with 25 parts of 1-hydroxy-4-aminobenzene, 6 parts of anhydrous sodium sulfite and 100 parts by volume of bisulfite liquor of 38° Bé., and the mixture is heated for 60 hours at 130 to 140° C. The condensation product thus obtained, is worked up and purified in the manner indicated in Example 2. The product has the properties of the product described in Example 2.

*Example 4.*—2 parts of 4-hydroxypyrene are heated with 4.4 parts of 1-hydroxy-4-aminobenzene, 20 parts by volume of sodium bisulfite lye of 30° Bé. and 1.2 parts of sodium sulfite to 160 to 170° C. for about 38 hours. After filtration the mass is extracted with hot water and dissolved in dilute caustic soda lye, precipitated by addition of sodium bisulfite and extracted with benzene. The clear yellow reaction product becomes black-blue when exposed to the air.

*Example 5.*—10.5 parts of 3-aminopyrene are heated for 40 hours to 130 to 150° C. together with 22 parts of 1-hydroxy-2-aminobenzene, 6.6 parts of sodium sulfite and 100 parts by volume of bisulfite lye of 30° Bé. The product of reaction is filtered by suction, washed with hot water, dissolved in dilute caustic soda lye under addition of some hydrosulfite. The yellow condensation product becomes brown olive when standing in the air.

*Example 6.*—12.2 parts of 2-hydroxychrysene are heated with the reactants mentioned in Example 5 for 40 hours to 150 to 170° C., filtered under suction, washed with hot water and boiled with xylene. After being dissolved in dilute caustic soda under addition of some hydrosulfite, the condensation product is reprecipitated by addition of bisulfite. The yellow condensation product is easily oxidized in the air.

What we claim is:—

1. The process which comprises condensing a hydroxyaminobenzene with an aromatic tetranuclear compound of the general formula $$A-X$$

wherein A is a member of the group consisting of the pyrene radicle and the chrysene radicle, X is a member of the group OH and NH$_2$, in the presence of a bisulfite liquor at a temperature of about 130 to about 170° C.

2. The process which comprises condensing a hydroxyaminobenzene with an aromatic tetranuclear compound of the general formula $$A-X$$

wherein A is a member of the group consisting of the pyrene radicle and the chrysene radicle, X is a member of the group OH and NH$_2$, in presence of a bisulfite liquor at a temperature of about 130 to about 170° C., the hydroxyaminobenzene being present in an amount exceeding about fourfold to about fivefold that required theoretically.

3. The process which comprises condensing 1-amino-4-hydroxybenzene with an aromatic tetranuclear compound of the general formula $$A-X$$

wherein A is a member of the group consisting of the pyrene radicle and the chrysene radicle, X is a member of the group OH and NH₂, in presence of a bisulfite liquor at a temperature of about 130 to about 170° C.

4. The process which comprises condensing 1-amino-4-hydroxybenzene with an aromatic tetranuclear compound of the general formula

A—X wherein A is a member of the group consisting of the pyrene radicle and the chrysene radicle, X is a member of the group OH and NH₂, in presence of a bisulfite liquor at a temperature of about 130 to about 170° C., the 1-amino-4-hydroxybenzene being present in an amount exceeding about fourfold to about fivefold that required theoretically.

5. The process which comprises condensing 1-amino-4-hydroxybenzene with an aromatic tetranuclear compound of the general formula

A—X wherein A is a member of the group consisting of the pyrene radicle and the chrysene radicle, X is a member of the group OH and NH₂, in presence of a bisulfite liquor containing neutral sulfite, at a temperature of about 130 to about 170° C.

6. The process which comprises condensing 1-amino-4-hydroxybenzene with an aromatic tetranuclear compound of the general formula

A—X wherein A is a member of the group consisting of the pyrene radicle and the chrysene radicle, X is a member of the group OH and NH₂, in presence of a bisulfite liquor containing neutral sulfite, at a temperature of about 130 to about 170° C., the 1-amino-4-hydroxybenzene being present in an amount exceeding about fourfold to about fivefold that required theoretically.

7. The hydroxyphenylaminoaryl compounds which correspond to the general formula

A—NHC₆H₄OH wherein A is a member of the group consisting of the pyrene and chrysene radicles.

8. The hydroxyphenylaminoaryl compounds which correspond to the general formula

wherein A is a member of the group consisting of the pyrene and chrysene radicles.

WALTER HAGGE.
HERBERT BACH.